(No Model.) 2 Sheets—Sheet 1.
T. NORDENFELT & C. G. MIDDELBOE.
NAVAL RANGE FINDER.
No. 414,819. Patented Nov. 12, 1889.
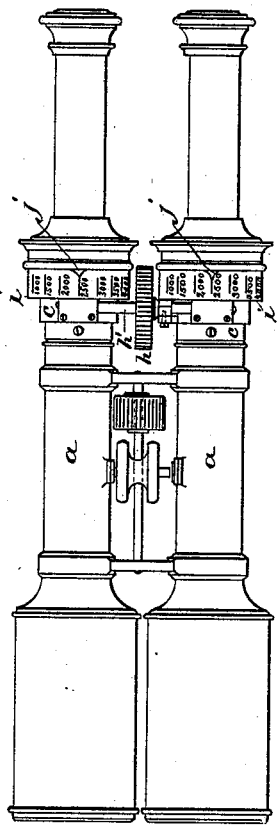
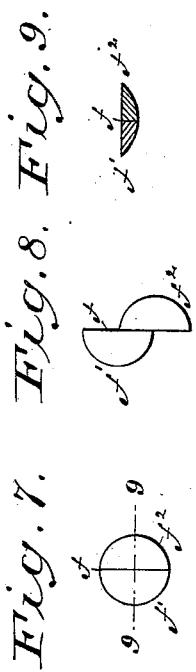
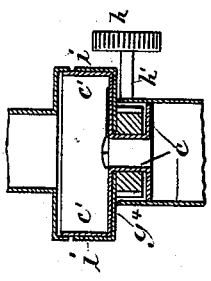
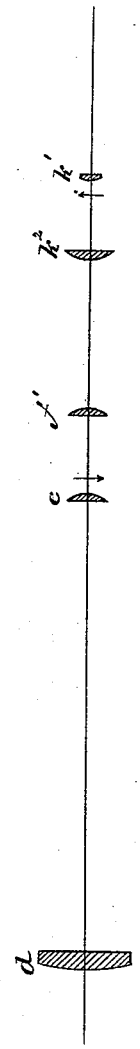
WITNESSES
H. C. Newman
E. S. Newman
INVENTOR
Thorsten Nordenfelt,
Christian Gjortz Middelboé,
By their Attorneys
Baldwin Davidson & Wight (No Model.) 2 Sheets—Sheet 2.
T. NORDENFELT & C. G. MIDDELBOE.
NAVAL RANGE FINDER.
No. 414,819. Patented Nov. 12, 1889.
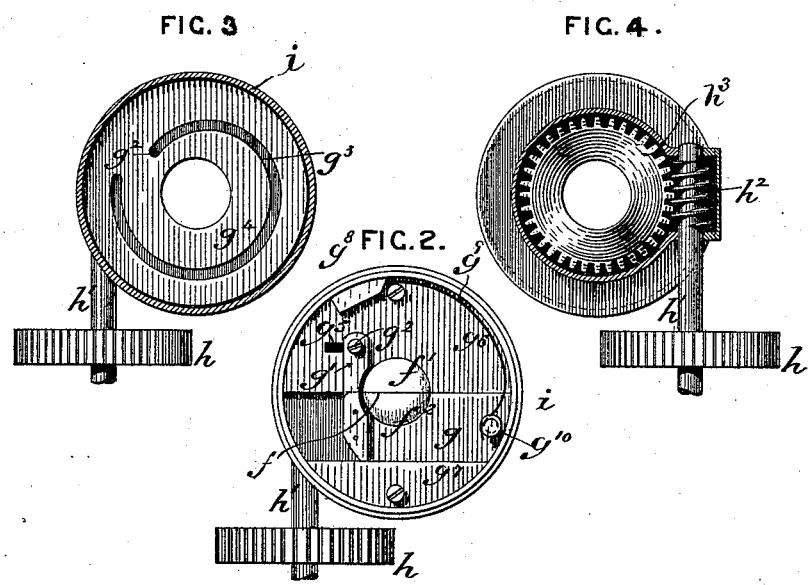

UNITED STATES PATENT OFFICE.

THORSTEN NORDENFELT, OF WESTMINSTER, ENGLAND, AND CHRISTIAN GJORTZ MIDDELBOE, OF COPENHAGEN, DENMARK.

NAVAL RANGE-FINDER.

SPECIFICATION forming part of Letters Patent No. 414,819, dated November 12, 1889.

Application filed February 7, 1887. Serial No. 226,751. (No model.) Patented in England December 5, 1884, No. 16,029, and August 15, 1885, No. 9,672; in France August 8, 1885, No. 170,538, and September 15, 1886, No. 176,161; in Italy September 30, 1885, No. 18,849, and June 30, 1886, No. 19,969; in Spain December 22, 1885, No. 7,866, and August 21, 1886, No. 9,218, and in Germany May 16, 1886, No. 38,910.

*To all whom it may concern:*

Be it known that we, THORSTEN NORDENFELT, civil engineer, a subject of the King of Sweden, residing at 53 Parliament street, in the city of Westminster, England, and CHRISTIAN GJORTZ MIDDELBOE, a subject of the King of Denmark, lieutenant in the royal Danish navy, of Copenhagen, in the Kingdom of Denmark, jointly have invented certain new and useful Improvements in Naval Range-Finders, (for which we have received Letters Patent in Great Britain, No. 16,029, dated December 5, 1884, and No. 9,672, dated August 15, 1885; in France, No. 170,538, dated August 8, 1885, and No. 176,161, dated September 15, 1886; in Italy, No. 18,849, dated September 30, 1885, and No. 19,969, dated June 30, 1886; in Spain, No. 7,866, dated December 22, 1885, and No. 9,218, dated August 21, 1886, and in Germany, No. 38,910, dated May 16, 1886,) of which the following is a specification.

This invention has for its object improvements in instruments for measuring distances at sea. We make these instruments to indicate conveniently and directly and without the aid of calculations or tables the distance of a ship or other object at sea.

The main principle upon which the instruments are constructed is that for any given height above the sea-level the angle between the line from the eye to the horizon and the perpendicular lowered from the eye to the sea-level is known, (it is constant and differs but slightly from a rectangle,) and if the angle between the line from the eye to the horizon and the line from the eye to the water-line of a ship or other object can be measured, then in the rectangular triangle determined by the following three points: First, the eye of the observer; second, the point on the water-line the distance of which is to be measured, and, third, the base of the perpendicular lowered from the observer's eye to the sea-level. Two angles and one side are known; therefore any other element of the triangle can be calculated.

We provide our instruments with a scale by which the necessity of calculation is avoided. This scale shows the distances resulting from varying angles between the line from the eye to the horizon and the line from the eye to the object when the height of the eye is known. The operator measures this angle, and an index directly indicates the distance on the scale.

The instrument is represented by the annexed drawings.

Figure 1 is a plan view of the complete instrument. Fig. 2 is an end view of one of the telescopes with the eye-piece end unscrewed and removed. Fig. 3 is a section taken just behind parts $f'$ $f^2$ of Fig. 2. Fig. 4 is a view showing features represented by Fig. 2, as seen when looked at from the opposite direction. Fig. 5 is a diagram showing the arrangement of the lenses. Fig. 6 is a central cross-section through one of the telescopes, showing also the milled wheel in plan. Fig. 7 is a front view of the lens-sections as they appear when coinciding. Fig. 8 is a front view of the lens-sections separated, and Fig. 9 is a cross-section on the line 9 9 of Fig. 7.

The instrument here represented is a binocular telescope. In each telescope one of the lenses is divided into two parts, and one part is movable in respect to the other. When the two parts occupy their natural position, or, in other words, when the two parts are concentric or coincide, as shown in Fig. 7, the telescope presents a single image; but when the two parts of the divided lens are not concentric, (one part being raised above the other, as shown in Fig. 8,) then the instrument presents two images, one overlapping the other. By moving the half-lens a suitable distance the horizon-line in one image can be brought to coincide with the water-line of a floating body, as seen in the other image.

The instrument is provided with a scale on which the distance between the centers of the two half-lenses is measured, and this scale is so marked that when the instrument is set as above described the distance from the observer of the floating body upon which the instrument has been set can be directly read off. The scale being graduated to correspond with the distance, it is necessary to move the half-lens to bring the horizon-line of one image to coincide with the water-line of the other image for all distances.

The instrument consists of two parallel telescopes $a\ a$, connected in any suitable way, so that the distance between the telescopes may be adjusted to suit the eyes of the observer while maintaining their parallelism, as usual. The telescopes also have the usual arrangements for focusing, there being a draw-tube $c$, and the draw-tubes are moved in and out simultaneously in the usual way. The two telescopes are similar in all respects. Beyond the focus of the object-glass $d$ and lens $e$ there is a convex lens carried by the draw-tube and divided diametrically on the line $f$ into two equal parts or segments $f'$ and $f^2$. (See Figs. 7, 8, and 9.) One half or part is fixed and the other half is in sliding contact therewith, being mounted in a slide $g$, Fig. 2, which is movable in a plane at right angles to the axis of the telescope between plate-sections $g^6\ g^7$, so that the two halves $f'\ f^2$ of the lens remain always in contact, though the part $f^2$ is capable of sliding laterally in the vertical plane of the lens. The slide has a projection $g'$, carrying a pin $g^2$, which projects through a slot $g^5$ and which engages with a snail-groove $g^3$ in the face of a disk $g^4$. A friction-block $g^8$, mounted on the end of a spring $g^9$ and secured to the slide $g$ at $g^{10}$, bears against the inner face of the tube and prevents the slide $g$ from moving except when positively actuated. The draw-tube $c$ is continued through the center of the disk $g^4$, as shown in Fig. 6, and is then bent back parallel with the disk $g^4$ and provided with an annular rim or flange $c'$, to the end of which the eye-piece is secured.

The disks $g^4$ of the two telescopes can be turned simultaneously by means of a milled head $h$, secured midway the length of an axis $h'$, provided at its ends with worms $h^2$, engaging with corresponding teeth $h^3$ on the backs of the disks. On the periphery of each disk is a flange $i$, and on this are the graduations, as shown in Figs. 1 and 6. The flange $i$ moves relatively to a pointer $j$.

$k'$ and $k^2$ are the lenses of the eye-piece.

The graduations are such that when the water-line of the floating body is brought to the horizon the true distance is read. The scale is of course graduated for a given elevation—say fifty feet. If the instrument is set on an elevation of one hundred feet, a proper allowance is of course made for this change.

When the sections $f'\ f^2$ of the lens coincide, as shown in Fig. 7, but one image is seen. After adjusting the instrument, as shown in Fig. 8, two images are seen, one above the other, the horizon-line of one image being brought to coincide with the water-line of the floating body, as seen in the other image. The scale-flange $i$ moves correspondingly with the movable lens, and the amount of movement of the scale relatively to the pointer $j$ is indicated, the scale being so marked that the distance from the observer to the object may be directly ascertained, the distance which the scale-flange moves depending on the movement of the lens, which depends on the distance of the object.

Having now particularly described and ascertained the nature of our said invention and in what manner the same is to be performed, we declare that what we claim, is—

1. The combination of a telescope, the measuring-lens diametrically divided into two parts or sections, a slide in which one of the lens-sections is carried, mechanism, substantially such as described, for operating the slide to adjust the movable lens-section relatively to the other along the line of division and in the vertical plane of the lens-sections, and a scale graduated to show the distance of the object to which the instrument is set from the object on which the instrument is mounted.

2. The combination of the telescope, the measuring-lens diametrically divided into two parts or sections, a slide in which one of the lens-sections is carried, a scale connected with the slide, an adjusting device $h$ for moving the slide and correspondingly moving the scale, whereby the vertical adjustment of the movable lens-section and the corresponding adjustment of the scale indicate the distance of the object to which the instrument is set from the object on which the instrument is mounted, substantially in the manner hereinbefore set forth.

3. In a binocular telescope, the combination of two measuring-lens sections in each telescope, a slide in each telescope for each movable lens-section, an operating or adjusting device $h$, connections between the adjusting device and the slides, whereby they may be simultaneously moved to adjust the measuring-lens sections relatively to the stationary sections along the line of division and in the vertical plane of the lenses, a scale graduated to show the distance of the object to which the instrument is set from the object on which the instrument is mounted.

4. The combination of the telescope, the divided lens, the slide carrying one part of the lens, a pin connected with the slide, a toothed graduated disk having a snail-groove with which the pin engages, and the worm engaging the teeth of the graduated disk, substantially as and for the purpose set forth.

THORSTEN NORDENFELT,
CHRISTIAN GJORTZ MIDDELBOE.

Witnessess to the signature of Thorsten Nordenfelt:
 E. BRUSEWITZ,
 F. A. NOËL,
*Both of 53 Parliament Street,*

Witnesses to the signature of Christian Gjortz Middelboe:
 L. HOYER,
 *Delfingade 9, Copenhagen.*
 JOH GRÜNDTOIG,
 *Dranningensgade, No. 1, Copenhagen.*